(12) United States Patent
Fischer et al.

(10) Patent No.: US 11,477,107 B2
(45) Date of Patent: Oct. 18, 2022

(54) METHOD FOR DATA COMMUNICATION IN AN INDUSTRIAL NETWORK, CONTROL METHOD, DEVICE, COMPUTER PROGRAM AND COMPUTER-READABLE MEDIUM

(71) Applicant: Siemens Aktiengesellschaft, Munich (DE)

(72) Inventors: Thomas Fischer, Erlangen (DE); Stephan Höme, Schwabach (DE); Konstantin Jung, Feucht (DE); Sven Kerschbaum, Fürth (DE); Marcel Kießling, Bayern (DE); Frank Volkmann, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 27 days.

(21) Appl. No.: 16/965,429

(22) PCT Filed: Jan. 3, 2019

(86) PCT No.: PCT/EP2019/050105
§ 371 (c)(1),
(2) Date: Jul. 28, 2020

(87) PCT Pub. No.: WO2019/149466
PCT Pub. Date: Aug. 8, 2019

(65) Prior Publication Data
US 2021/0120065 A1    Apr. 22, 2021

(30) Foreign Application Priority Data

Jan. 31, 2018  (EP) ..................................... 18154319
Jul. 9, 2018   (EP) ..................................... 18182351

(51) Int. Cl.
*H04L 43/10* (2022.01)
*H04L 67/12* (2022.01)
(Continued)

(52) U.S. Cl.
CPC .......... *H04L 43/10* (2013.01); *G05B 19/4185* (2013.01); *H04L 12/40* (2013.01);
(Continued)

(58) Field of Classification Search
CPC ....... H04L 43/10; H04L 12/40; H04L 43/026; H04L 43/0858; H04L 47/76;
(Continued)

(56) References Cited

U.S. PATENT DOCUMENTS 5,602,841 A * 2/1997 Lebizay ................ H04L 49/201
370/413
6,246,692 B1 * 6/2001 Dai ........................ H04L 12/42
370/438
(Continued)

FOREIGN PATENT DOCUMENTS

CN    1679017    10/2005
CN    1947454    4/2007
(Continued)

OTHER PUBLICATIONS

Nasrallah Ahmed et al: "Ultra-Low Latency (ULL) Networks: A comprehensive Survey Covering the IEEE TSN Standard and Related ULL Research", arxiv.org, Cornell University Library, 201 Olin Library Cornell University Ithaca, NY 14853, abstract, pp. 1-23; 2018.
(Continued)

*Primary Examiner* — Thu V Nguyen
*Assistant Examiner* — Angela M Widhalm De Rodrig
(74) *Attorney, Agent, or Firm* — Cozen O'Connor

(57) ABSTRACT

A control method, device, computer program and a computer-readable medium and method for data communication
(Continued)

in an industrial network, wherein a stream is created between at least two stream subscribers, where resources are reserved on at least one node point, particularly bridges and/or switches between the at least two stream subscribers, and subsequently data is transmitted between the at least two stream subscribers, via the stream, and at least one subscriber of the stream interrupts the emittance and/or reception of data via the stream and resources that are reserved on at least one node point for the at least one subscriber of the stream are released for use for a data transmission that is lower priority than the data transmission via the stream, and where the reservation of the resources being maintained for the at least one subscriber.

19 Claims, 2 Drawing Sheets

(51) Int. Cl.
| | |
|---|---|
| *H04L 43/0852* | (2022.01) |
| *H04L 43/026* | (2022.01) |
| *H04L 65/80* | (2022.01) |
| *G05B 19/418* | (2006.01) |
| *H04L 12/40* | (2006.01) |
| *H04L 47/76* | (2022.01) |
| *H04L 65/1093* | (2022.01) |
| *H04L 65/61* | (2022.01) |
| *H04L 65/65* | (2022.01) |

(52) U.S. Cl.
CPC ........ *H04L 43/026* (2013.01); *H04L 43/0858* (2013.01); *H04L 47/76* (2013.01); *H04L 65/1093* (2013.01); *H04L 65/61* (2022.05); *H04L 65/65* (2022.05); *H04L 65/80* (2013.01); *H04L 67/12* (2013.01)

(58) Field of Classification Search
CPC ............. H04L 65/1093; H04L 65/4069; H04L 65/608; H04L 65/80; H04L 67/12; G05V 19/4185
See application file for complete search history.

(56) References Cited

U.S. PATENT DOCUMENTS

| | | | |
|---|---|---|---|
| 7,058,947 B1* | 6/2006 | Raja ...................... G06F 9/5027 709/223 |
| 7,689,998 B1* | 3/2010 | Chrysanthakopoulos ................... G06F 9/4881 718/104 |
| 9,917,791 B1* | 3/2018 | Goldfain ............... H04L 67/145 |
| 2006/0168337 A1 | 7/2006 | Stahl et al. |
| 2007/0232280 A1 | 10/2007 | Pruser et al. |
| 2008/0037571 A1 | 2/2008 | Hetzel et al. |
| 2008/0298241 A1 | 12/2008 | Ohana et al. |
| 2009/0049175 A1 | 2/2009 | Finn |
| 2009/0245758 A1* | 10/2009 | Kodama ................ H04N 5/765 386/291 |
| 2010/0238799 A1 | 9/2010 | Sebire |
| 2012/0314597 A1 | 12/2012 | Singh et al. |
| 2013/0070788 A1 | 3/2013 | Deiretsbacher et al. |
| 2013/0259452 A1* | 10/2013 | Hashimoto .......... H04N 21/814 386/293 |
| 2015/0124600 A1 | 5/2015 | Nöbauer et al. |
| 2015/0131681 A1 | 5/2015 | Balbierer et al. |
| 2017/0055216 A1 | 2/2017 | Nieminen et al. |
| 2017/0250920 A1 | 8/2017 | Park et al. |
| 2017/0265183 A1* | 9/2017 | Chen ..................... H04W 72/10 |
| 2017/0331719 A1* | 11/2017 | Park ....................... H04L 45/00 |
| 2019/0238441 A1 | 8/2019 | Goetz et al. |
| 2020/0050494 A1* | 2/2020 | Bartfai-Walcott .... G06F 9/5083 |
| 2020/0252838 A1* | 8/2020 | Akdeniz ............... H04W 76/11 |

FOREIGN PATENT DOCUMENTS

| | | | | |
|---|---|---|---|---|
| CN | 101079743 | | 11/2007 | |
| CN | 101355491 | | 1/2009 | |
| CN | 101647299 | | 2/2010 | |
| CN | 101779198 | | 7/2010 | |
| CN | 102907070 | | 1/2013 | |
| CN | 103597778 | | 2/2014 | |
| CN | 104243353 | | 12/2014 | |
| CN | 104272659 | | 1/2015 | |
| CN | 104285407 | | 1/2015 | |
| CN | 106465041 | | 2/2017 | |
| CN | 106921594 | | 7/2017 | |
| EP | 3522477 | | 8/2019 | |
| WO | WO-0167787 A2 * | 9/2001 | ......... H04L 12/1822 |
| WO | WO 2009/003421 | 1/2009 | |
| WO | WO-2010100446 A1 * | 9/2010 | ......... G06F 19/3418 |

OTHER PUBLICATIONS

PCT International Search Report and Written Opinion of International Searching Authority dated Mar. 20, 2019 corresponding to PCT International Application No. PCT/EP2019/050105 filed Jan. 3, 2019.
EP Search Report dated Jan. 29, 2019 based on EP18182351 filed Jul. 9, 2018.
Liu, "The MAC Technique of WLAN", Introduction of Media Access Control Technology in Wireless LAN, Journal of Xi'an University of Post and Telecommunications, vol. 12, No. 3, May 10, 2007, pp. 39-43.
Shu et al., "Releasing Network Isolation Problem in Group-Based Industrial Wireless Sensor Networks" IEEE Systems Journal, vol. 11, No. 3, 2017, pp. 1340-1350.
Guihe et al., "Survey on In-Vehicle Multimedia Network Technology" Computer Applications and Software vol. 31, No. 1, 2015, pp. 1-5.
Fanliang, "Research and Advancement of IEEE802.15.4 Network Based on Time-Sensitive Applications" Nankai University, Jan. 15, 2011, pp. 1-67.

* cited by examiner

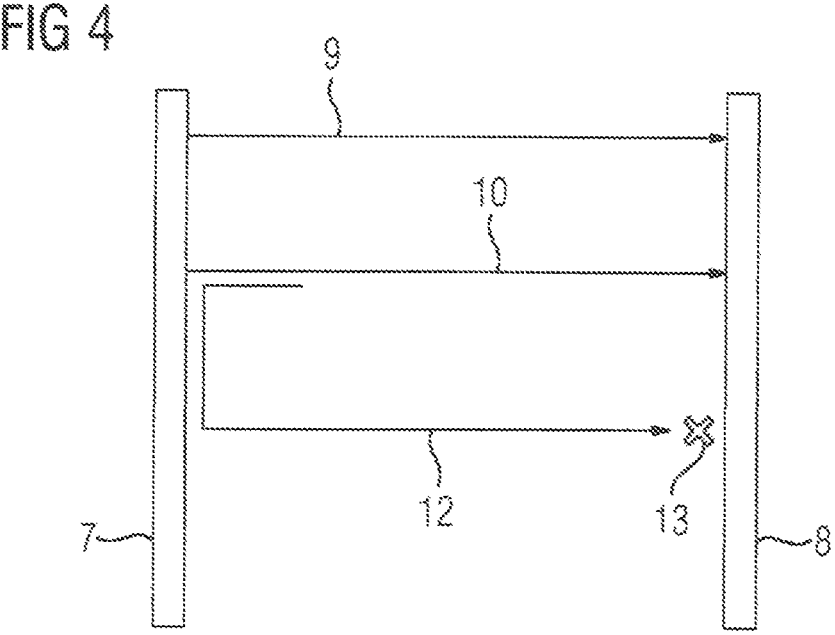
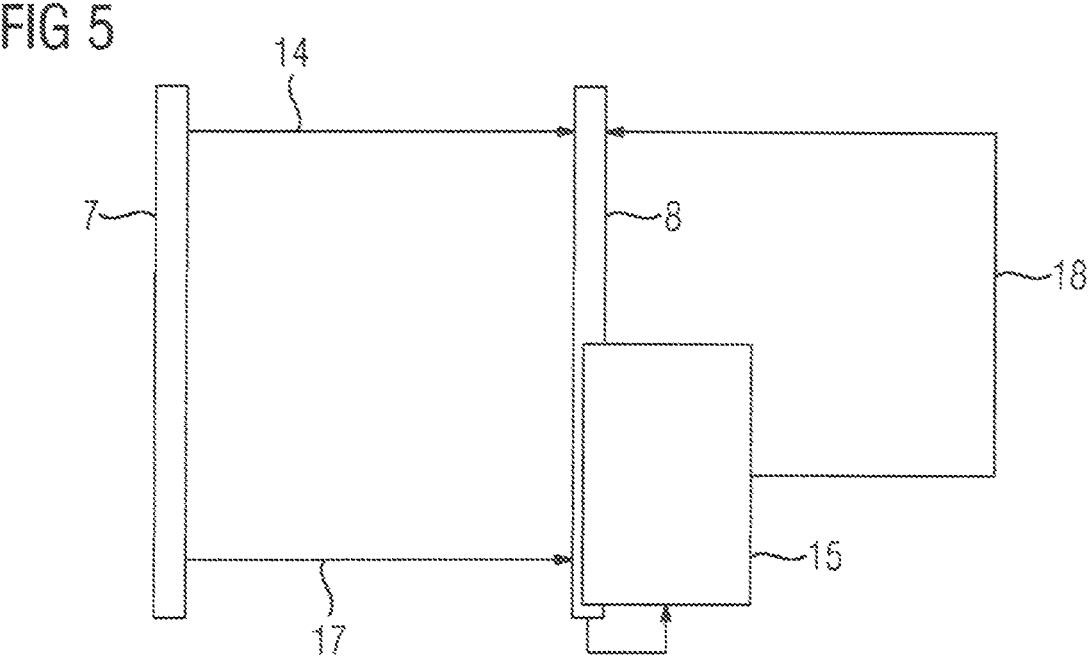

METHOD FOR DATA COMMUNICATION IN AN INDUSTRIAL NETWORK, CONTROL METHOD, DEVICE, COMPUTER PROGRAM AND COMPUTER-READABLE MEDIUM

CROSS-REFERENCE TO RELATED APPLICATIONS

This is a U.S. national stage of application No. PCT/EP2019/050105 filed 3 Jan. 2019. Priority is claimed on European Application Nos. 18154319.0 filed 31 Jan. 2018 and 18182351.9 filed 9 Jul. 2018, the contents of which are incorporated herein by reference in their entirety.

BACKGROUND OF THE INVENTION

1. Field of the Invention

The invention relates to a control method, a device, a computer program and a computer-readable medium and method for data communication in a particularly industrial network, where a stream is established between at least two stream subscribers, where resources are reserved at one or more node points, i.e., bridges and/or switches, arranged between the at least two stream subscribers and subsequently data is transmitted between the at least two stream subscribers via the stream.

2. Description of the Related Art

Time Sensitive Networking (TSN) denotes a series of standards which extends the Bridging Standard institute of Electrical and Electronics Engineers (IEEE) 802.1Q with mechanisms for transferring real time-critical data via Ethernet networks. The standards mentioned include, for example, Time Synchronization (IEEE 802.1AS-Rev), Frame Preemption (IEEE 802.1Qbu) and Reservation (IEEE 802.1Qca, IEEE 802.1Qcc) and other standards.

With time sensitive networking, a standard is defined which guarantees the quality of service (QoS) in a network in the form of streams. A stream usually represents a uni-directionally protected communication connection from a source (talker) to one or more sinks (listeners).

"Multiple listeners per stream" was introduced by Audio/Video Bridging (AVB) in order to reduce the number of real time data flows (IEEE 802 names these "stream") from a source (talker) to a plurality of targets (listeners). Specifically, the data transfer from one talker to a plurality of listeners is enabled via just one stream.

European patent application EP 18154319.0, which also originates from the applicant, disclosed a stream reservation model that enables "Multiple Talkers per Listener", specifically the transfer of data from a plurality of talkers to one listener via just one stream.

Before the actual data transfer via stream, a path calculation and a registration and reservation occur to obtain guarantees from the network for a loss-free, i.e., real time, transfer of data frames and a punctual delivery. For this purpose, the network must verify the availability of network resources (for example, address table entries, frame buffers, transmit time slices) and allocate resources to them—if available—and do this for each real time data flow, i.e., stream, and must provide access for real time data traffic.

Within the network, it is necessary to store the control information regarding registrations, reservations and routing information for each stream. The status of each reservation must be maintained. With an increasing number of terminals and their data traffic, real time data traffic, the same network, the quantity of network control information increases. The memory stores and processing capacity of network node points, for example, bridges or switches, is limited. Consequently, this limitation sometimes represents a scaling problem.

It can arise that one or more network subscribers, for example, controllers, sensors and/or actuators or devices comprising these network subscribers are temporarily removed from the network or deactivated. This can be due, for example, to servicing and/or a defect that is to be remedied.

In this case, a communication is temporarily no longer needed because either a device that represents a talker of a stream is no longer transmitting and/or a device that forms a listener of a stream can no longer accept data so that a transmission thereto is temporarily not required or possible. In such a case, according to the present knowledge of the applicant, the reservation of the bandwidth on the associated network path is either maintained and the bandwidth is not otherwise utilized, which leads to a hindering of the entire network. In a conventional alternative, the stream is extinguished with the complete configuration, so that the reserved resources become available again. If a temporarily removed network subscriber is reconnected, then an entirely new configuration must occurs and a repercussion-free restart cannot be guaranteed.

SUMMARY OF THE INVENTION

In view of the foregoing, it is therefore an object of the present invention to provide a method that offers an optimal use of network resources, in particular, also in the case that temporarily no data is sent to one or more stream subscribers and or that temporarily no data is received from it or them.

This and other objects and advantages are achieved by a method in which at least one subscriber of the stream interrupts the transmission and/or reception of data via the stream and resources that are reserved at one or more node points for the at least one subscriber of the stream are released for use for a data transfer that is assigned a lower priority than the data transfer via the stream, where the reservation of the resources is maintained for the at least one subscriber.

The fundamental concept of the present invention is, in other words, the introduction of a "sleep mode" for streams and, in the event that at least one stream subscriber temporarily does not wish or is unable to transmit and/or receive any data, to make the resources reserved therefor temporarily available for use for a data transfer with a lower priority communication class. In accordance with the invention, the configuration settings of the stream are thereby sustained, even during "third-party use" of the resources.

The method in accordance with the invention enables reserved resources to be subsequently available to the stream traffic without delay when the at least one stream subscriber wishes to send and/or receive data again, while accepting that the lower priority communication is disrupted at this moment. This applies, in particular, for network-controlled cyclical communication, e.g., when a Time Aware Shaper (TAS) is used.

In the case of a TAS, for example, the time slots are reserved exclusively for use by the streams. No other transfer can use these time slots. With pausing, the time slots become reusable. When a stream subscriber, for example, a talker awakes, the stream subscriber can then initiate the reservation anew, although an existing scheduling still only "reactivated" and is not calculated anew. Another stream cannot use the resources because it may not use the scheduling. However, best effort traffic (that which has "lower priority") can use the time slots in the "sleep" state until the stream registration is activated again.

Following a pausing of a network subscriber, which can caused, for example, by a removal and/or deactivation of a subscriber and can lie in the region of minutes or hours, a data exchange can then effectively occurs again immediately, in particular, after one or a few milliseconds that may be needed for a "reactivation" of the resources. A complete recalculation of a scheduling, on the other hand, would take minutes or, for more complex networks, possibly hours.

Preferably, all resources that are reserved for the at least one stream subscriber that temporarily interrupts the transmission and/or reception of data are made available to the network for low priority communication.

The released resources can be used by at least one further subscriber of the network for a data transfer that is assigned a lower priority than the data transfer via the stream.

For obtaining one or more protected connections, i.e, one or a plurality of streams, resources are reserved in a per se known manner before the actual transfer of the data, in the node point or points, via which the data transfer is to occurs, this being possible using a reservation protocol.

Through the use of a reservation protocol for the real time flow, the complex configuration is performed automatically in the network, where the respective topology present is used. Resources, in particular, network resources that are reserved for a transfer via stream, can be, for example, address table entries and/or frame buffers and/or transmit time slices and/or bandwidth and/or jitter and/or latency.

The maintenance in accordance with the invention of the reservation subsequently to an interruption or a pausing of a data transfer from and/or to at least one stream subscriber can be achieved, for example, because configuration data or configuration settings belonging to the reservation remain stored in one or more, preferably all the node points via which data is, or is to be, transferred via the stream, even if the data transfer from or to a stream subscriber is temporarily suspended. The configuration data and/or settings that remain stored can be, for example, an address entry in the FDB, the administration of the queue stores used for the real time data and/or a configuration of the shaper and/or the TAS mechanism.

Conventionally, the stream description (in particular stream ID, frame size, number of frames per interval, forwarding address used) is periodically updated. Upon failure of a link (for example, by reason of a removal and/or deactivation of a talker), the values received by this device are immediately deleted.

The transfer of data via stream preferably occurs in a TSN network. A TSN network is to be understood as one that satisfies one or more standards designated Time Sensitive Networking (TSN), in particular one that comprises one or more TSN-capable node points, such as switches and/or bridges. The TSN standards include, for example, Time Synchronization (IEEE 802.1AS-Rev), Frame Preemption (IEEE 802.1Qbu) and Reservation (IEEE 802.1Qca, IEEE 802.1Qcc) and other standards. In principle, it is also possible that the transfer of data via stream takes place in a network which satisfies (only) AVB standards, in particular IEEE 802.1AS, IEEE 802.1Qat, IEEE 802.1Qav and/or IEEE 802.1BA.

In accordance with the invention, the at least one subscriber of the stream, after it has interrupted the transmission and/or reception of data via the stream, can subsequently continue the transmission and/or reception of data via the stream using the resources reserved for the at least one subscriber of the stream, where any data transfer with a lower priority using the resources reserved for the at least one subscriber of the stream is ended.

In particular, the at least one subscriber of the stream will continue the transmission and/or reception of data via the stream without the reservation of resources for the stream being calculated and/or performed anew.

It can be that the at least one subscriber of the stream is deactivated and, in particular, due to the deactivation of the at least one subscriber of the stream, no more data is transmitted and/or received via the stream. Alternatively or additionally, it is possible for the at least one subscriber of the stream to be separated from the network and, in particular, due to the separation from the network of the at least one subscriber of the stream, no more data is transmitted and/or received via the stream.

If the at least one subscriber of the stream is separated from the network, then the at least one subscriber of the stream can subsequently be connected to the network again and then the data transfer via the stream can be continued. In the event that the at least one subscriber of the stream has alternatively or additionally been deactivated, the at least one subscriber of the stream can subsequently be activated again and then the data transfer via the stream can be continued. In both cases, the maintenance in accordance with the invention of the resource reservation enables a particularly frictionless and rapid resumption of the stream data transfer.

In addition, it is guaranteed that the resources are not used by another stream during the pause or a "switch-off" phase and would therefore no longer be available after a switch-on and/or a renewed connection.

In a particularly preferred embodiment of the invention, the at least one subscriber of the stream transmits a sleep message before or after or simultaneously with the interruption of the transmission and/or reception of data via the stream and, in reaction to the sleep message, the resources that are reserved at one or more node points for the at least one subscriber of the stream are released for use for a data transfer that is assigned a lower priority than the data transfer via the stream.

The sleep message can be initiated, for example, by a central site and sent to the first node point, in particular, the first bridge, or can be signaled directly by a network device (for example, a talker) forming a stream subscriber, to the network. The first node point, in particular, the first bridge, then maintains the reservation for all the subsequently participating network components although the subscriber is no longer connected to the network and/or is switched off.

In particular, with the transmission of a sleep message, a temporary interruption of the data transfer can be communicated to the network. It is also possible in a particularly simple manner via the introduction of sleep messages to distinguish between only temporary interruptions of the transmission or reception via stream, for instance, based on a temporary deactivation or removal of a subscriber for maintenance purposes, and an enduring ending of the data transfer. In the case of an enduring ending, for example, in the event that a device that forms a stream subscriber is completely removed from the network, no sleep mode in which the resource reservation is maintained must be selected, but rather the reservation can be abolished again.

Alternatively or in addition to the transmission of sleep messages, for example, an item of additional information can also be added via the sleep mode directly in the stream description (in particular, in the reservation protocol) or via a configuration by the management of the reservation protocol. An activation of the sleep mode can then occur, preferably automatically, in particular, directly in reaction to an interruption of the transmission and/or reception of data from a stream subscriber, and/or in reaction to a separation of a stream subscriber from the network and/or a deactivation of a stream subscriber. Similarly, an ending of the sleep mode can occur, in particular, automatically in reaction to data again being transmitted and/or received by the stream subscriber, and/or in reaction to a stream subscriber again being connected to the network and/or activated, i.e., switched on.

It is further preferably provided that the at least one subscriber of the stream, after it has interrupted the transmission and/or reception of data via the stream, transmits a wake-up message and, in reaction to the wake-up message, any data transfer with a lower priority using the resources reserved for the at least one subscriber of the stream is ended within a pre-determined timespan.

With the wake-up message, the network can be informed in a simple manner that the at least one stream subscriber again desires a data transfer.

If the interrupted data transfer from and/or to the at least one subscriber of the stream is attributable thereto that it has been separated from the network, the at least one subscriber of the stream will send the wake-up message after it has been reconnected to the network, in particular, immediately after the renewed connection.

In the same manner, in the event that alternatively or additionally the at least one subscriber of the stream has been temporarily deactivated, it will transmit the wake-up message after being reactivated, in particular, immediately after the (re)activation.

Alternatively or additionally, it is possible that in place of the wake-up message, a regular registration of the stream that was previously protected by the sleep message, which then uses the previously protected resources, is initiated.

In a further embodiment of the method in accordance with the invention, the at least one subscriber of the stream additionally cyclically transmits and/or receives keep-alive messages when it transmits and/or receives data via the stream. Then, the at least one subscriber of the stream will preferably end the transmission of keep-alive messages when it interrupts the transmission and/or reception of data via the stream. In the sleep mode provided in accordance with disclosed embodiments of the invention, the transmission of keep-alive messages is suitably suspended.

The at least one subscriber of the stream that temporarily interrupts the transmission and/or reception of data via stream is preferably a component of an industrial automation system, for example, one that comprises at least one sensor and/or at least one actuator or is formed thereby.

Naturally, in a network a plurality of subscribers can temporarily interrupt the transmission and/or reception of data via a stream. If this is the case, for one, for a plurality or even for all stream subscribers that are affected thereby, the sleep mode in accordance with disclosed embodiments of the invention can be activated in which the resources that are reserved for each subscriber to a stream at one or more node points for use for a data transfer that is assigned a lower priority than the data transfer via the stream, are released, where the reservation of the resources is maintained for each subscriber.

In the case of TAS, the transmission time windows can usually only be used for the stream data by the "sleep" mode in accordance with the disclosed embodiments of the invention, in particular also for, e.g., the best-effort class. In the case of other TSN shapers, the transfer of best-effort can always use the bandwidth that is not needed. A reservation of a new stream, however, cannot use the resources maintained through the "sleep" mode that are needed for the stream. A plurality of stream subscribers for which the sleep mode in accordance with the disclosed embodiments of the invention is used can naturally be subscribers to one, i.e., the same, stream or to different streams.

It is also an object of the present invention to provide a control method for an industrial technical process or a vehicle, where data is exchanged between at least two components of an automation system while performing the method in accordance with the disclosed embodiments and, based on the exchanged data, control of the industrial technical process or vehicle occurs.

It a further object of the invention to provide a device that is configured for implementing the method in accordance with the disclosed embodiments of invention for data communication or the control method in accordance with disclosed embodiments of the invention, comprising in particular: one or more node points, in particular bridges and/or switches, and at least two devices forming stream subscribers that are connected to one another via one or more node points, where the devices forming the at least two stream subscribers are preferably components of an industrial automation system.

It is a further object of the invention to provide a computer program that comprises program code means for performing the method in accordance with the disclosed embodiments of the invention for data communication or the control method in accordance with the disclosed embodiments of the invention.

It is moreover a further object of the invention to provide a computer readable medium that comprises instructions which when they are carried out on at least one computer, cause the at least one computer to perform the method in accordance with the disclosed embodiments of the invention for data communication, or of the control method in accordance with the disclosed embodiments of the invention.

The computer-readable medium can be, for example, a CD-ROM or DVD or a USE or Flash memory store. It should be noted that a computer-readable medium should not be understood as being exclusively a physical medium, but such a medium can also be present, for example, in the form of a data stream and/or a signal which represents a data stream.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will now be made clear with the following description of an embodiment of the method of the present invention, making reference to the accompanying drawings, in which:

FIG. 4 is a purely schematic representation of the sequences on removal of a network subscriber when a no sleep mode in accordance with the invention is provided;

FIG. 5 is a purely schematic representation of the sequences on removal and subsequent renewed connection of a network subscriber when a sleep mode accordance with the invention is provided.

DETAILED DESCRIPTION OF THE EXEMPLARY EMBODIMENTS

Figure 1:
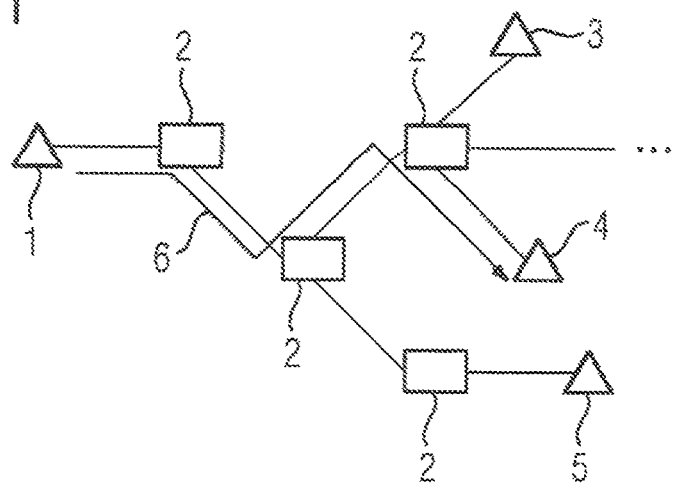
FIG. 1 is a schematic partial representation of an industrial network with a plurality of subscribers, where data is exchanged between two network subscribers via a stream in accordance with the invention.

FIG. 1 shows a purely schematic partial representation of an industrial Ethernet-based network. Specifically, a terminal is shown that represents a transmitter/talker 1 and that is connected via a plurality of network node points in form of bridges 2, of which only four are shown in FIG. 1, to a plurality of further terminals, each of which represents a receiver/listener 3, 4, 5. In FIG. 1, three of the receivers 3, 4, 5 are shown. The three dots on the right in the drawing are intended to make clear that behind the bridge 2 at top right, further bridges 2 and terminals (can) follow.

As is apparent in FIG. 1, the Ethernet-based network with the plurality of bridges 2 in the exemplary illustrated embodiment is distinguished by a tree topology. Naturally, other conventional network topologies, for example, a linear, star or ring topology can also be provided.

The network in the present case is a TSN network, i.e., one that satisfies one or more standards designated Time Sensitive Networking (TSN). In particular, in the present case, the node points 2 are provided by TSN-capable bridges 2. The TSN standards include, for example, Time Synchronization (IEEE 802.1AS-Rev), Frame Preemption (IEEE 802.1Qbu) and Reservation (IEEE 802.1Qca, IEEE 802.1Qcc) and other standards.

The terminal forming the transmitter in the present case an SPS 1 of an industrial automation system for a technical process (not shown further). The terminals forming the receivers are a screen 3 on which data received from the SPS 1 can be visualized for an operator, a terminal 4 that comprises one or more actuators (not shown in the drawings), which require control signals from the SPS 1 cyclically, order to act upon the industrial technical process cyclically, and an analysis device 5 that receives data from the SPS 1 and analyzes it. On the basis of the data exchanged between the SPS 1 and the device 4, a control of the industrial technical process occurs. The data is transferred from the SPS 1 to the three terminals 3, 4, 5 in the form of data frames via the Ethernet-based network.

The frame forwarding from the SPS 1 to the device 4 with the actuators thereby occurs via a protected connection, i.e., a "stream". The data communication via a stream that is known, for instance, from the Audio/Video Bridging (AVB) and Time Sensitive Networking (TSN) standards ensures, in particular, that a preset latency time that can vary from stream to stream and depends, in particular, on the respective application, is adhered to. It is thereby ensured that the control signals arrive at the actuators of the terminal 4 within a pre-determined maximum latency time, i.e., a maximum latency period elapses between the feeding of the data into the network by the SPS 1 and the receipt of the data at the actuators. Thus, for instance, an in particular real time-critical communication between the SPS 1 and the device 4 with the actuators can be ensured.

It is the case thereby that a stream as defined, for example, by the Audio/Video Bridging (AVB) Task Group and, in particular, by the TSN Task Group in the international standard IEEE 802.1, is established by making use of a stream reservation protocol (in the present case, for example, the Stream Reservation Protocol (SRP) or the extension MSRP), whereby a stream can be obtained between a transmitter and a receiver or a stream can also be obtained between a transmitter 1 and a plurality of receivers. The first configuration recognizably corresponds to that in FIG. 1.

For the establishment of a stream between the SPS 1 and the device 4, a reservation of resources occurs at each node point 2 that passes on data frames from the SPS 1 to the device 4.

The sequence is such that in a first step, a Talker Advertise message is output by the transmitter, i.e., the SPS 1. With this, the SPS 1 announces the stream the network and the properties of the stream are described. The SPS 1 specifies, in particular, a stream ID, a forwarding address and an item of bandwidth information for the data transfer originating from it.

The announcement of the stream is distributed to all the node points, in the present case, therefore, bridges 2 in the network, whereby each bridge 2 then holds the information of the receiving port, i.e., of the port in the direction of the SPS 1 forming the talker, via which the notification has been received and later the data also enters. The data source is also designated a talker 1. As a result, this port also has the designation talker port. The ports in the direction of the listener(s) are accordingly also designated transmitter ports or listener ports.

One or more listeners can register on the stream offered by the SPS 1. In the exemplary illustrated embodiment, only the device 4 with the actuators registers itself, where this is not to be understood as restrictive and it is naturally also possible that a plurality of listeners register themselves. A Listener Join message is sent bar the device 4 in the direction of the SPS 1.

At each of the bridges 2 that are arranged between the SPS 1 and the device 4, a reservation is performed at the port in the direction of the device 4, i.e., the listener port according to the stream description given by the SPS 1 representing the talker, provided the available resources at the respective bridge 2 are sufficient. Each node point 2 checks whether its internal resources are sufficient for the performance demanded in the context of the stream to be established (in particularly regarding data quantity and data throughput). If this is the case, the node point 2 reserves these resources for the stream to be established and passes on a positive reservation status to the subsequent bridge 2 or the last bridge to the transmitter, i.e., the SPS 1. In the exemplary illustrated embodiment, in total three node points, in the present case bridges 2, are arranged on the network path connecting the SPS 1 to the device 4 and resource reservations occurs at these three.

With the reservation, each node point 2 can ensure that it guarantees the required performance during the subsequent data transfer. This is where streams differ from unprotected connections. If insufficient resources are available, then a negative reservation status is forwarded.

The reservation starts at the bridge 2 closest to the respective receiver/listener, i.e., to the device 4 and "propagates" along the associated network path to the data source/talker, i.e., to the SPS 1.

The reservation is thereby based upon the forwarding tree also referred to as Talker Tree ($T_{Tree}$) that can be established, for example, with the Rapid Spanning Tree Protocol (RSTP).

Following a successful reservation, data frames are transferred cyclically from the SPS 1 to the device 4. The device 4 transmits "keep-alive" messages to the next node point 2 on the network path from the device 4 to the SPS 1. With this, the reservation is maintained. Following expiry of the timer, unconfirmed reservations are marked and following expiry of a confirmation time (2nd timer) are deleted internally. Thereby, previously removed devices are recognized, the reservation is abolished and the resources are released again.

Data frames also pass cyclically from the SPS 1 to the two further devices 3, 5, but because they do not need data in real time, it does not pass via a protected connection, that is, via stream. Therefore, for the data transfer to the two further devices 3, 5, no resources are reserved at the node points 2 on the network path between each device 3, 5, and the SPS 1.

In FIG. 1, it is indicated schematically with an arrow 6 connecting the SPS 1 to the device 4 with the actuators that the data transfer occurs via stream.

In FIG. 4 purely schematically and by way of example, a device or trigger is indicated by a bar having the reference sign 7, and an associated network path (which is defined by one or more node points 2) is indicated by an opposite bar having the reference sign 8. An arrow 9 pointing from the device or trigger 7 to the network path 8 indicates the command of the resource reservation for establishment of a stream. A further arrow 10 from the device or trigger 7 to the network path 8 symbolizes the data communication utilizing the reserved stream 6.

It can occur that one or more network subscribers are temporarily removed from the network and/or deactivated. This can be due, for example, to servicing and/or a defect that is to be remedied. Here, a communication is temporarily no longer needed since either the device no longer transmits and/or no longer receives data. In the present case, no further data is received by the device 4.

In the case that a removed or deactivated device represents a stream subscriber and the resource reservation is maintained on the associated network path, when TAS and an exclusive time window are used for the stream, the bandwidth cannot be used in any other way, leading to a hindering of the entire network. However, if the stream has been deleted, then the reserved resources would be available again. As soon as the only temporarily removed or deactivated network subscriber is reconnected or reactivated, however, a completely new configuration must take place and a repercussion-free restart cannot be guaranteed.

Figure 2:
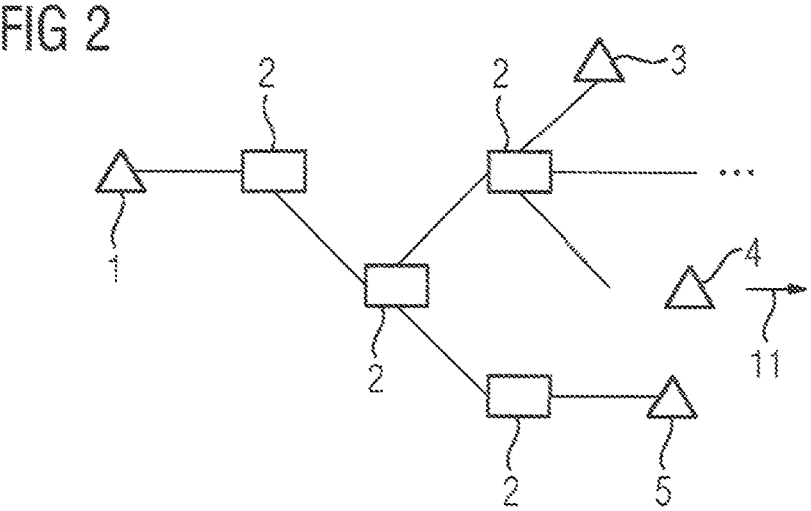
FIG. 2 is a schematic partial representation of the industrial network of FIG. 1, where one of the two network subscribers that have exchanged data via the stream has been removed from the network in accordance with the invention.

Indicated in FIG. 2, purely schematically, by an arrow 1 is the separation of the device 4 from the network.

It is indicated in FIG. 4 by a third, turned-back arrow 12 and a cross 13 that no more data is transmitted and/or received by the temporarily removed and/or deactivated device.

In order to enable an optimum usage of network resources, in particular, also in the case that temporarily no data is transmitted to one or more stream subscribers and/or that temporarily no data is (able to be) received by it or them, in accordance with the invention, a sleep mode is provided.

Specifically, the device 4 forming a stream subscriber interrupts the transmission and/or reception of data via the stream 6, the resources that are reserved for the device 4 at all the node points, in the present case bridges 2, on the network path between the SPS 1 and the device 4, for use for a data transfer that is assigned a lower priority than the data transfer via the stream 6, are released.

The reservation of the resources for the device 4 at the three node points 2 between the SPS 1 and the device 4 is thereby maintained, despite the release for the lower priority use and during any use of the resources for a lower priority communication. The reservation therefore not abolished. Specifically, configuration settings at all three node points 2 belonging to the reservation remain stored, in the present case, the address entry in the FDB, the administration of the queue memory used for real time data and the necessary configuration of the shaper or of the TAS mechanism. When IEEE 802.1CB is applied, the filters needed for the recognition of the stream data and the history needed for the recognition of duplicates must additionally be present for storing the previously received sequence numbers in the bridges.

For the activation of the sleep mode, the device 4 can transmit the sleep property of a stream directly to the next node point 2 in an extended stream description as notification in an extended stream description, as notification in a sleep mode message, or via a central site in the management of the network components 2, the setting for the stream can be performed and/or a message can be sent to the bridge 2.

In FIG. 5, this is indicated (again purely schematically), specifically the transmission of the sleep message to the next node point 2 on the network path 8 between the SPS 1 and the device 4 is indicated by an arrow 14 that points from the bar 7 at left in the figure representing a device or a trigger, to the bar 8 representing the network path. In the sleep mode, which is indicated with a block element provided with the reference sign 15, the resources are made available for lower priority use, whilst however the reservation remains in place.

Figure 3:
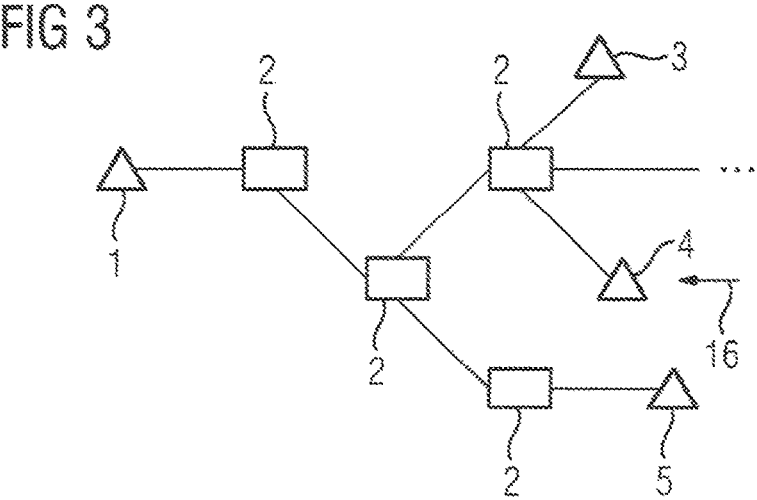
FIG. 3 is a schematic partial representation of the industrial network of FIGS. 1 and 2, where the previously removed network subscriber is reconnected to the network and the data exchange is continued via the stream in accordance with the invention.

The released resources at the three node points 2 on the network path 8 are used in the exemplary illustrated embodiment for a transfer of data from the SPS 1 to the screen 3 and the analysis device 5, where, due to the path geometry, the latter only uses the resources of two of the three node points 2, whereas the screen 3 uses the resources of all three node points 2 (see FIGS. 1 to 3).

After, for example, servicing of the removed device 4 has been completed, the device 4 is connected to the network again, which is indicated schematically in FIG. 3, by an arrow 16 there.

As soon as the device 4 is connected to the network again, the device 4 transmits a wake-up message to the three node points 2 on the network path 8 that connects the SPS 1 to the device 4.

The transmission of the wake-up message is indicated in FIG. 5 by an arrow 17 from the bar 7 to the bar 8. In reaction to the wake-up message, any data transfer with a lower priority using the resources reserved for the at least one subscriber of the stream is ended and the renewed active reservation is signaled to the subscribers. With the previously provided resources, it is ensured that the previously performed reservation has sufficient resources available in the node points 2.

The device 4 then continues the reception of data from the SPS 1 via the stream 6 without the reservation of resources for the stream 6 being recalculated and/or performed anew. The reservations maintained, in accordance with the invention, at the three node points 2 during the sleep mode are thereby available again effectively immediately, in particular, after only one or a few milliseconds.

The restoration of the data communication is shown in FIG. 5 by an arrow 18 that points from the block element 15 representing the sleep mode to the network path.

It should be noted that the components shown in FIGS. 1 to 3 can represent part of an embodiment of a device in accordance with the invention, which then itself forms, in particular, part of an automation system.

The method in accordance with the invention enables temporarily non-required resources reserved for a stream to be passed to a different use, so that an optimum usage of existing network resources can occur, where, at the same time, after a temporary non-use of a stream, the resources are guaranteed to be available again for the stream traffic without delay. This occurs while accepting that the lower priority communication is possibly disrupted at this moment.

FIG. 6 is a flowchart of the method for data communication in an industrial network, where a stream 6 is established between at least two stream subscribers 1, 4, resources are reserved, and data is subsequently transmitted between the at least two stream subscribers 1, 4 via the stream 6.

The method comprises interrupting, by at least one subscriber 4 of the stream 6, at least one of (i) a transmission and (ii) reception of data via the stream 6, as indicated in step 610.

Next, resources reserved at the at least one node point 2 are released for the at least one subscriber 4 of the stream 6 for use for a data transfer which is assigned a lower priority than the data transfer via the stream 6, as indicated in step 620. In accordance with the invention, the reservation of the resources is maintained for the at least one subscriber 4.

Although the invention has been illustrated and described in detail with the preferred exemplary embodiment, the invention is not restricted by the examples disclosed and other variations can be derived therefrom by a person skilled in the art without departing from the protective scope of the invention.

For example, it should be understood that even if the sleep mode according to the invention was described in the context of the above exemplary embodiment for a stream 6 with two stream subscribers 1, 4, this can be activated, in the event that in a network two or more streams are established of which one stream subscriber transmits and/or receives no data via the stream, for two or more streams.

It should be understood the sleep mode in accordance with the disclosed embodiments of the invention can also be used if a subscriber temporarily does not transmit and/or receive from a stream with more than two stream subscribers or if a plurality of participants also temporarily do not transmit and/or receive.

Finally, it must be clear that the at least two stream subscribers given in the context of the exemplary above-described embodiments via an SPS 1 and a device 4 with actuators are selected only by way of example and stream subscribers for which, in accordance with the disclosed embodiments of the present invention, a sleep mode is established can also be present in the form of any other desired devices.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for data communication in an industrial network, a stream being established between at least two stream subscribers, resources being reserved, and data being subsequently transmitted between the at least two stream subscribers via the stream, the method comprising:

interrupting, by at least one subscriber of the stream, at least one of (i) a transmission and (ii) reception of data via the stream when the at least one subscriber of the stream temporarily refrains from or is unable to at least one of (i) transmit any data and (ii) receive any data; and releasing resources reserved at a at least one node point for the at least one subscriber of the stream for use for a data transfer which is assigned a lower priority than the data transfer via the stream, said reservation of the resources being maintained for the at least one subscriber;

wherein the at least one subscriber of the stream transmits a sleep message at least one of (i) before, (ii) after and (iii) simultaneously with the interruption of at least one of (i) the transmission and (ii) reception of data via the stream and, in reaction to the transmitted sleep message, the resources that are reserved at the at least one node point for the at least one subscriber of the stream are released for utilization for a data transfer which is assigned a lower priority than the data transfer via the stream.

2. The method as claimed in claim 1, wherein the at least one subscriber of the stream, after said least one subscriber has interrupted at least one of the (i) transmission and (ii) reception of data via the stream, subsequently continues at least one of (i) the transmission and (ii) reception of data via the stream utilizing the resources reserved for the least one subscriber, and wherein any data transfer with a lower priority utilizing the resources reserved for the at least one subscriber of the stream is ended.

3. The method as claimed in claim 2, wherein the at least one subscriber of the stream continues at least one of the (i) transmission and (i) reception of data via the stream without the reservation of resources for the stream being at least one of recalculated and reperformed.

4. The method as claimed in claim 1, wherein the released resources are utilized by at least one further subscriber of a network for a data transfer which is assigned a lower priority than the data transfer via the stream.

5. The method as claimed in claim 1, wherein at least one of:

(i) the at least one subscriber of the stream is deactivated and, due to said deactivation of the at least one subscriber of the stream, no additional data is at least one of (i) transmitted and (ii) received via the stream and (ii) the at least one subscriber of the stream is separated from a network and, due to the separation from the network of the at least one subscriber of the stream, no additional data is at least one of (i) transmitted and (ii) received via the stream.

6. The method as claimed in claim 5, wherein at least one of (i) the at least one subscriber of the stream has been separated from a network and thereafter, is reconnected to the network and (i) the at least one subscriber of the stream has then been deactivated and thereafter is reactivated.

7. The method as claimed in claim 1, wherein the at least one subscriber of the stream, after said at least one subscriber has interrupted at least one of (i) the transmission and (ii) reception of data via the stream, transmits a wake-up message and, in reaction to said wake-up message, any data transfer with a lower priority using the resources reserved for the at least one subscriber of the stream is ended within a pre-determined timespan.

8. The method as claimed in claim 6, wherein at least one of (i) the at least one subscriber of the stream transmits a wake-up message after it has been reconnected to a network and (ii) the at least one subscriber of the stream transmits the wake-up message after said at least one subscriber has been reactivated.

9. The method as claimed in claim 7, wherein at least one of (i) the at least one subscriber of the stream transmits the wake-up message after it has been reconnected to a network and (ii) the at least one subscriber of the stream transmits the wake-up message after said at least one subscriber has been reactivated.

10. The method as claimed in claim 1, wherein the at least one subscriber of the stream additionally transmits keep-alive messages when said at least one subscriber at least one of (i) transmits and (ii) receives data via the stream; and
wherein the at least one subscriber of the stream, ends the transmission of keep-alive messages when said least one subscriber interrupts at least one of (i) the transmission and (ii) reception of data via the stream.

11. The method as claimed in claim 1, wherein the reservation of the resources for the at least one subscriber of the stream is maintained in that at least one of configuration data and configuration settings belonging to the reservation remain stored at one or more node points.

12. The method as claimed in claim 1, wherein the transfer of data via the stream occurs in an Audio/Video Bridging (AVB) or Time Sensitive Networking (TSN) network.

13. The method as claimed in claim 1, wherein the at least one subscriber of the stream comprises a component of an industrial automation system.

14. The method as claimed in claim 13, wherein component of the industrial automation system comprises at least one of (i) at least one sensor and (ii) at least one actuator or is formed thereby.

15. The method as claimed in claim 1, wherein the at least one node point comprises at least one of (i) bridges and (ii) switches arranged between the at least two stream subscribers.

16. A control method for an industrial technical process or a vehicle, wherein data is exchanged between at least two components of an automation system while performing the method as claimed in claim 1 and, based on the exchanged data, control of the industrial technical process or vehicle occurs.

17. A device comprising:
at least one data point; and
at least two devices forming stream subscribers which are connected to one another at least one node point;
wherein the at least two devices forming at least two stream subscribers comprise components of an industrial automation system:
wherein the device is configured to:
    interrupt at least one of (i) a transmission and (ii) reception of data via a stream when at least one subscriber of the stream temporarily refrains from or is unable to at least one of (i) transmit any data and (ii) receive any data; and
    release resources reserved at the at least one node point for at least one device of the stream for use for a data transfer which is assigned a lower priority than the data transfer via the stream, said reservation of the resources being maintained for the at least one device; and
wherein the at least one subscriber of the stream transmits a sleep message at least one of (i) before, (ii) after and (iii) simultaneously with the interruption of at least one of (i) the transmission and (ii) reception of data via the stream and, in reaction to the transmitted sleep message, the resources that are reserved at the at least one node point for the at least one subscriber of the stream are released for utilization for a data transfer which is assigned a lower priority than the data transfer via the stream.

18. The device as claimed in claim 17, wherein the at least one node point comprises at least one of (i) bridges and (ii) switches arranged between the at least two stream subscribers.

19. A computer-readable medium encoded with a computer program comprises instructions which, when executed by perform at least one computer, causes the at least one computer to establish a stream between at least two stream subscribers, resources being reserved, and data being subsequently transmitted between the at least two stream subscribers via the stream in an industrial network, the computer program comprising:
instructions for interrupting, by at least one subscriber of the stream, at least one of (i) a transmission and (ii) reception of data via the stream when the at least one subscriber of the stream temporarily refrains from or is unable to at least one of (i) transmit any data and (ii) receive any data; and
instructions for releasing resources reserved at a at least one node point for the at least one subscriber of the stream for use for a data transfer which is assigned a lower priority than the data transfer via the stream, said reservation of the resources being maintained for the at least one subscriber;
wherein the at least one subscriber of the stream transmits a sleep message at least one of (i) before, (ii) after and (iii) simultaneously with the interruption of at least one of (i) the transmission and (ii) reception of data via the stream and, in reaction to the transmitted sleep message, the resources that are reserved at the at least one node point for the at least one subscriber of the stream are released for utilization for a data transfer which is assigned a lower priority than the data transfer via the stream.

* * * * *